FIG. 5

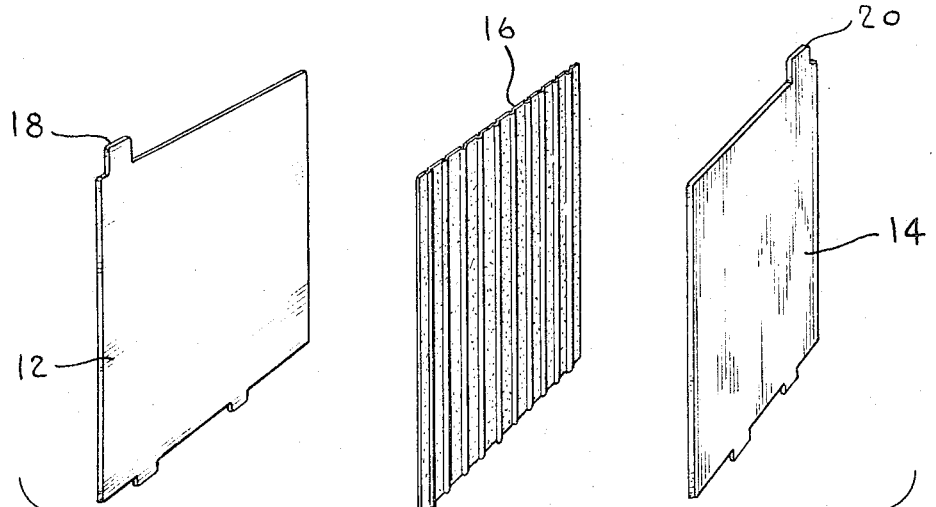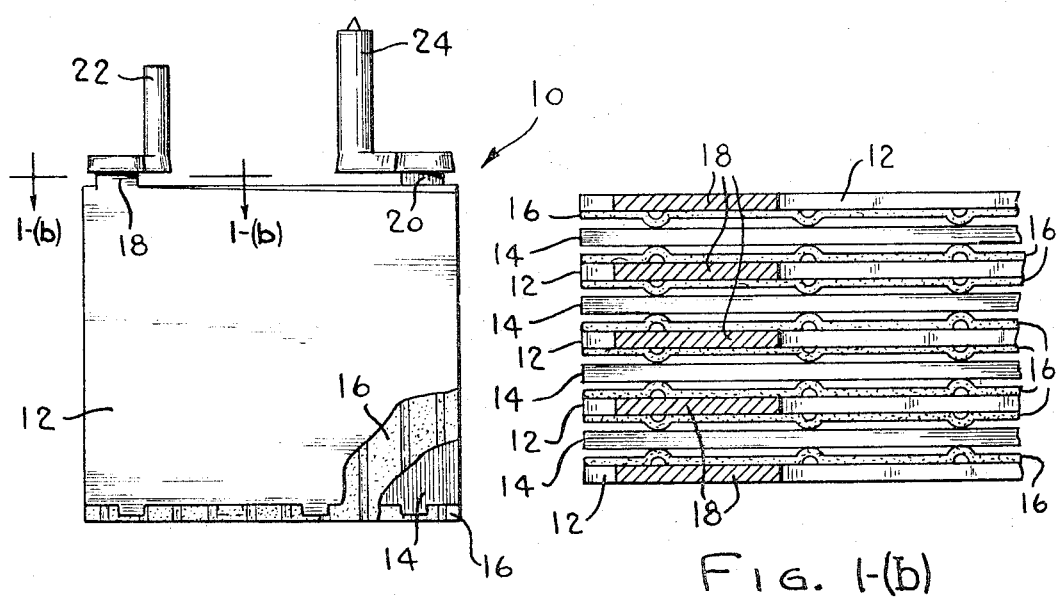

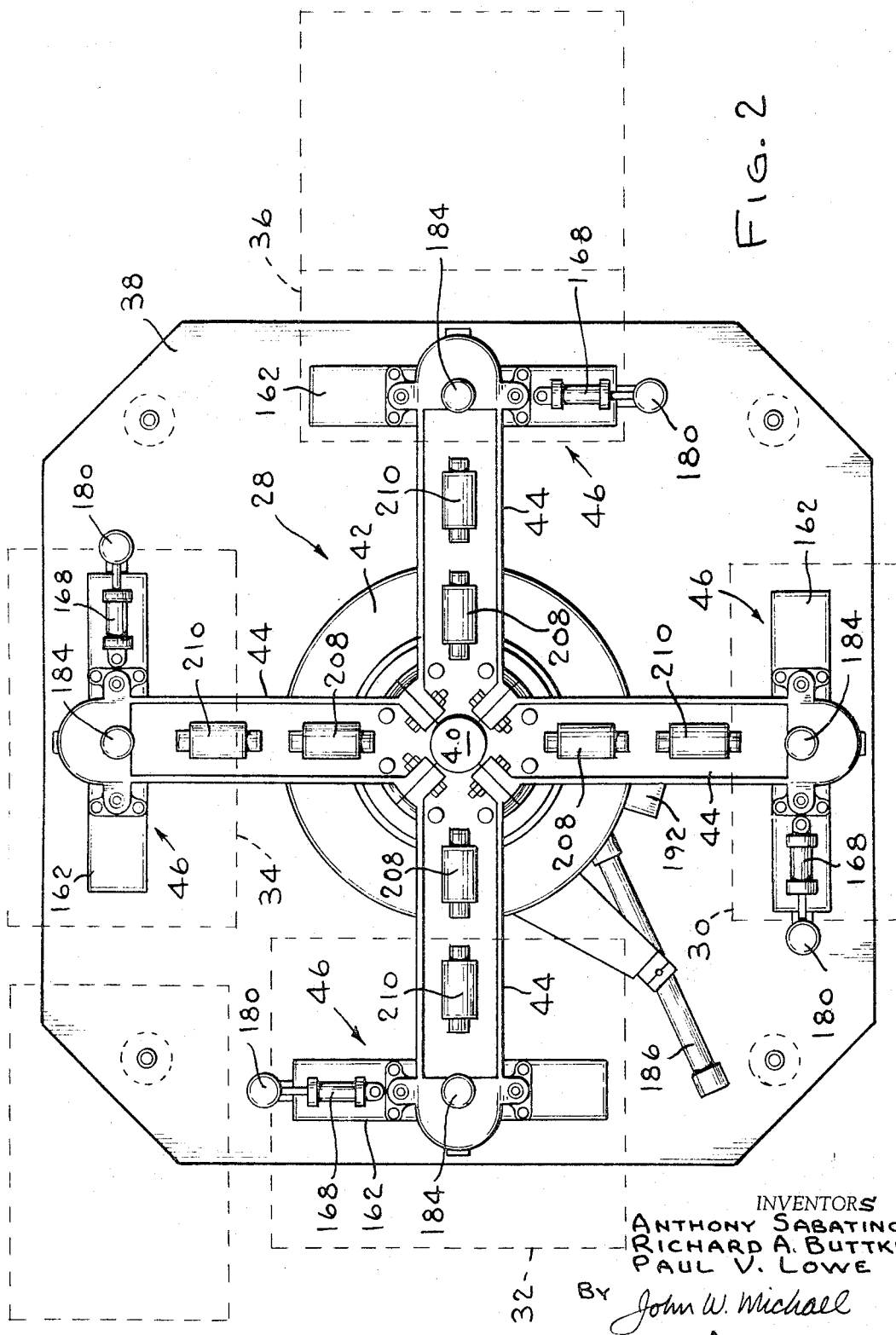

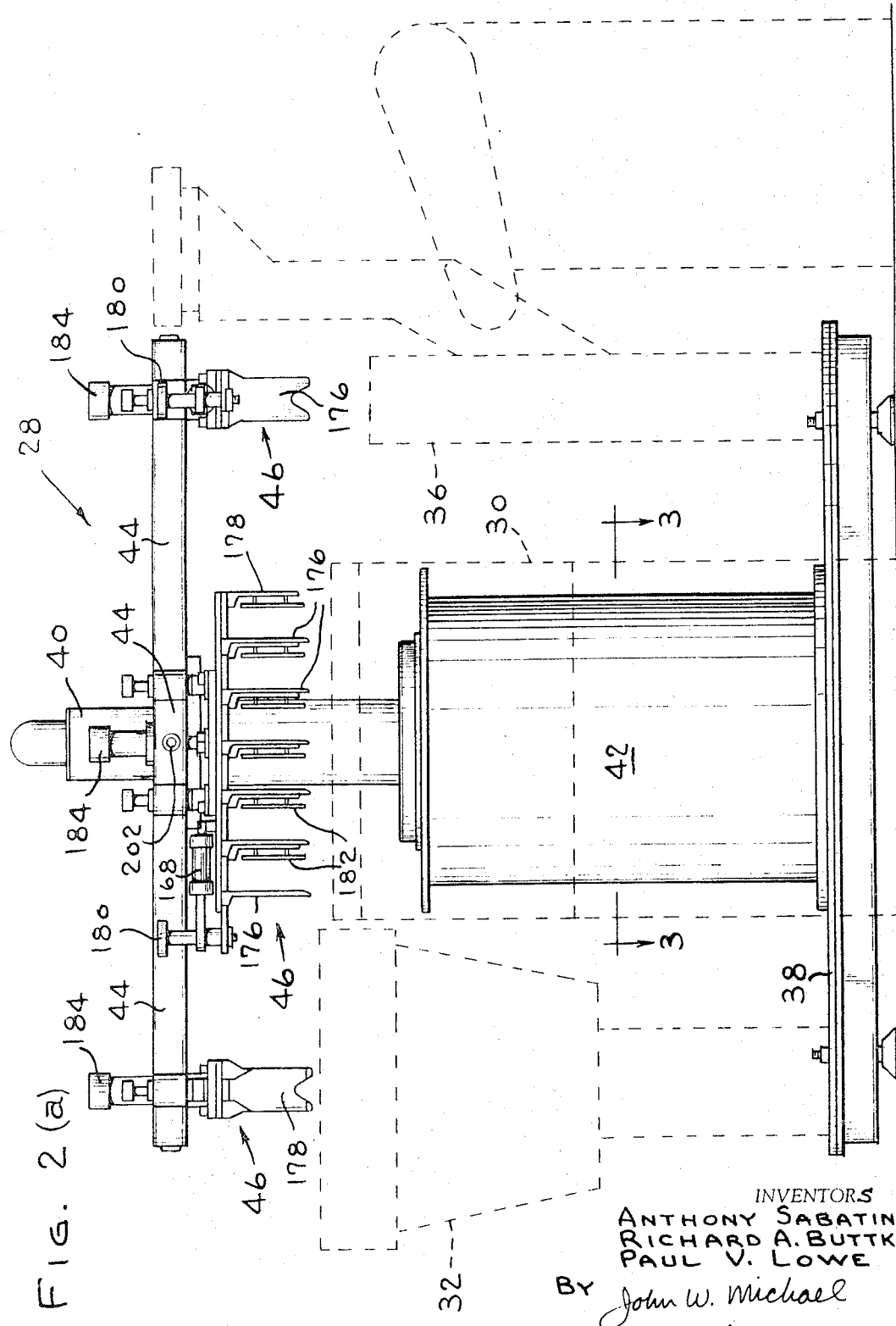

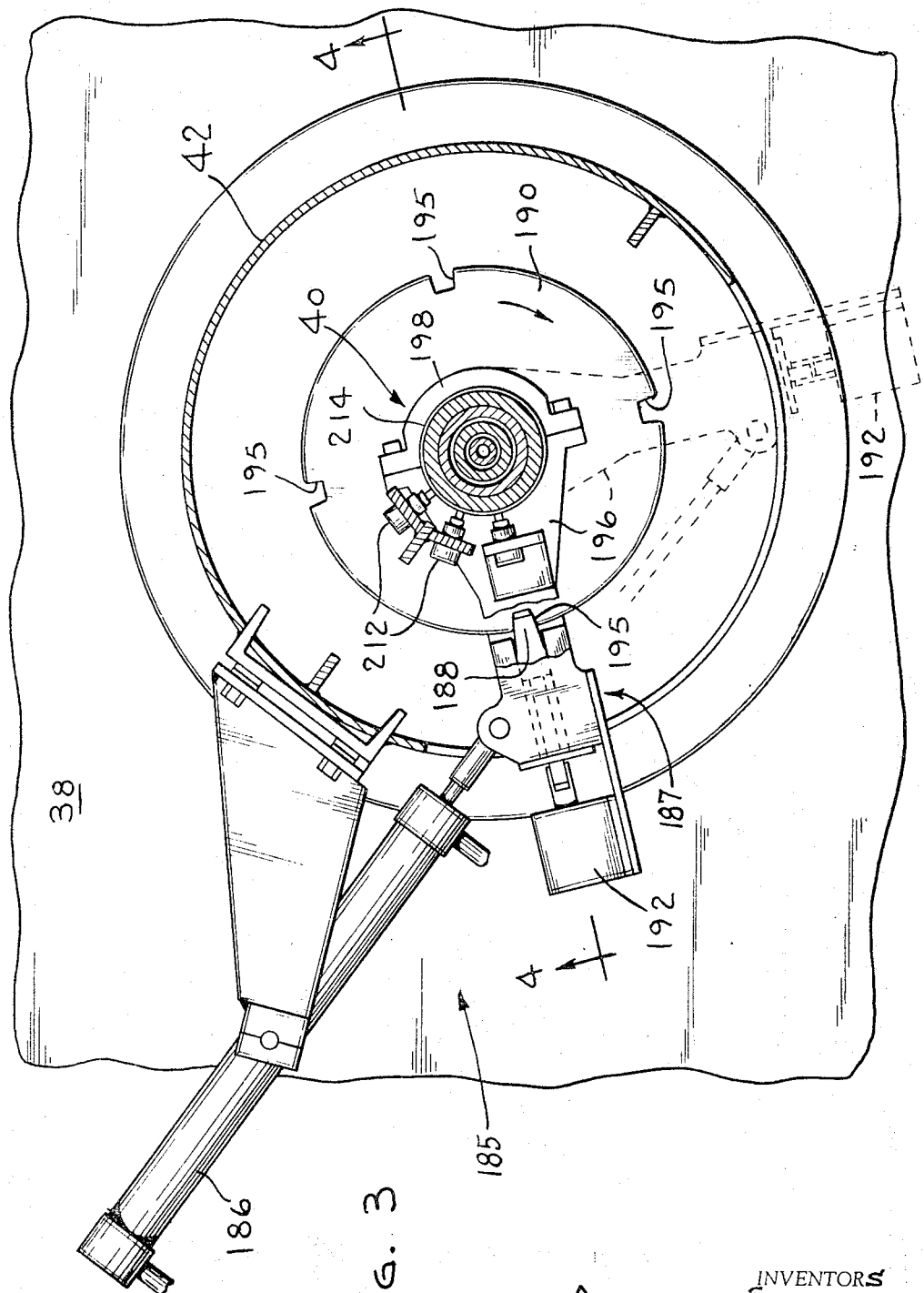

INVENTORS
ANTHONY SABATINO
RICHARD A. BUTTKE
PAUL V. LOWE
BY John W. Michael
ATTORNEY Dec. 27, 1966
A. SABATINO ET AL
3,294,258
APPARATUS FOR ALIGNING THE PLATES AND SEPARATORS OF A BATTERY STACK
Original Filed Dec. 30, 1960
17 Sheets-Sheet 8
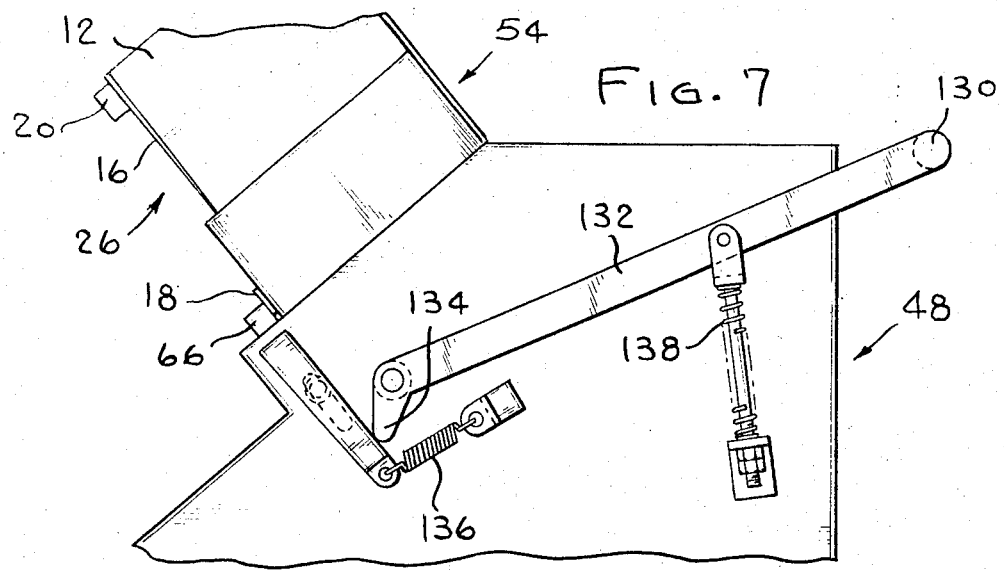
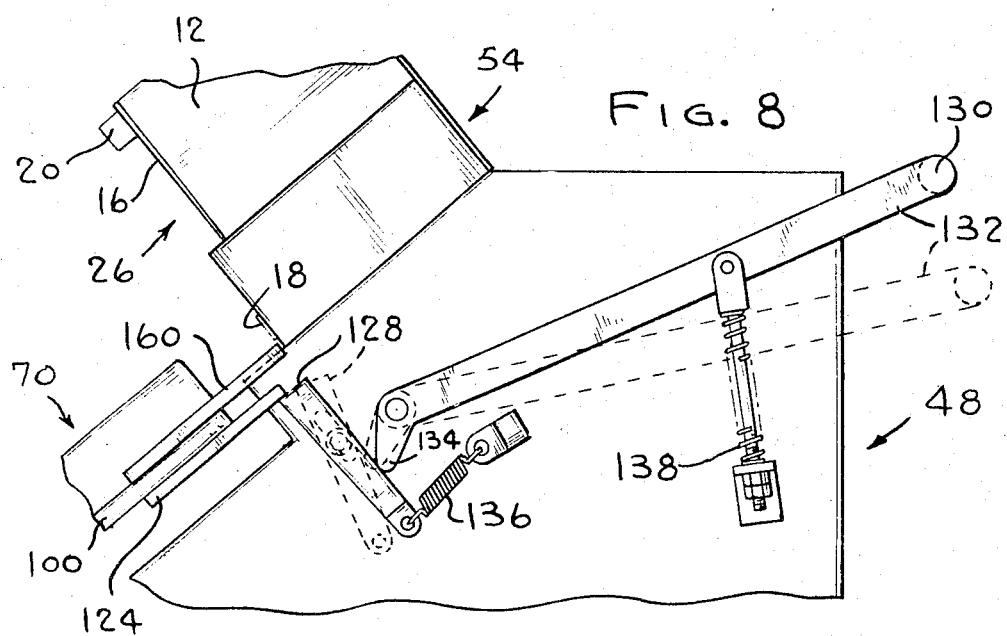
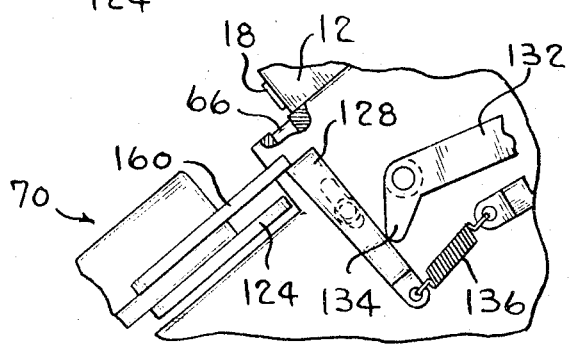
INVENTORS
ANTHONY SABATINO
RICHARD A. BUTTKE
PAUL V. LOWE
BY John W. Michael
ATTORNEY

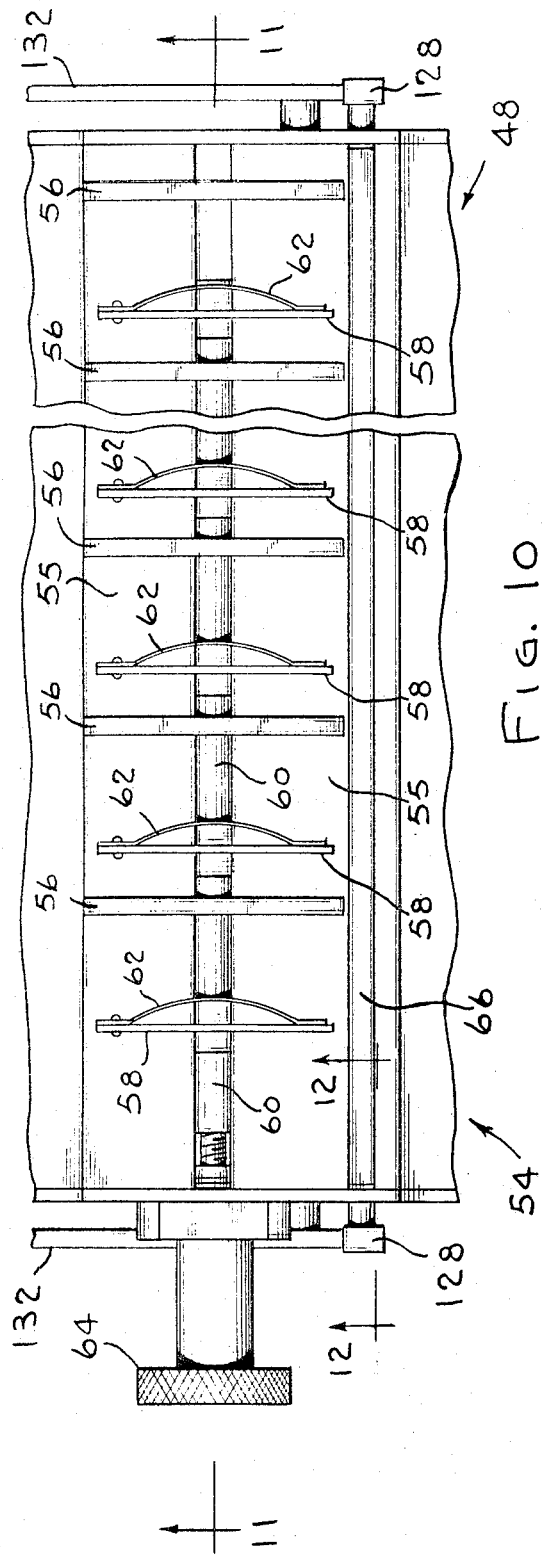
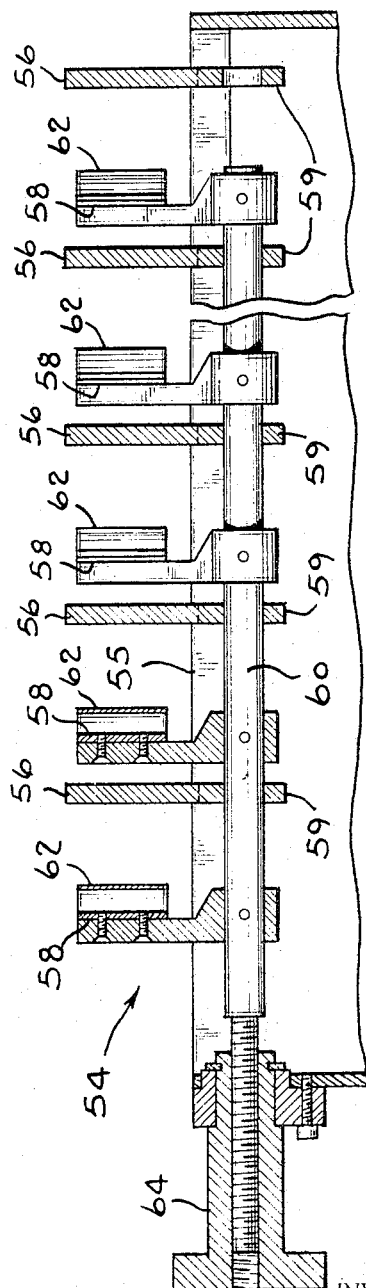

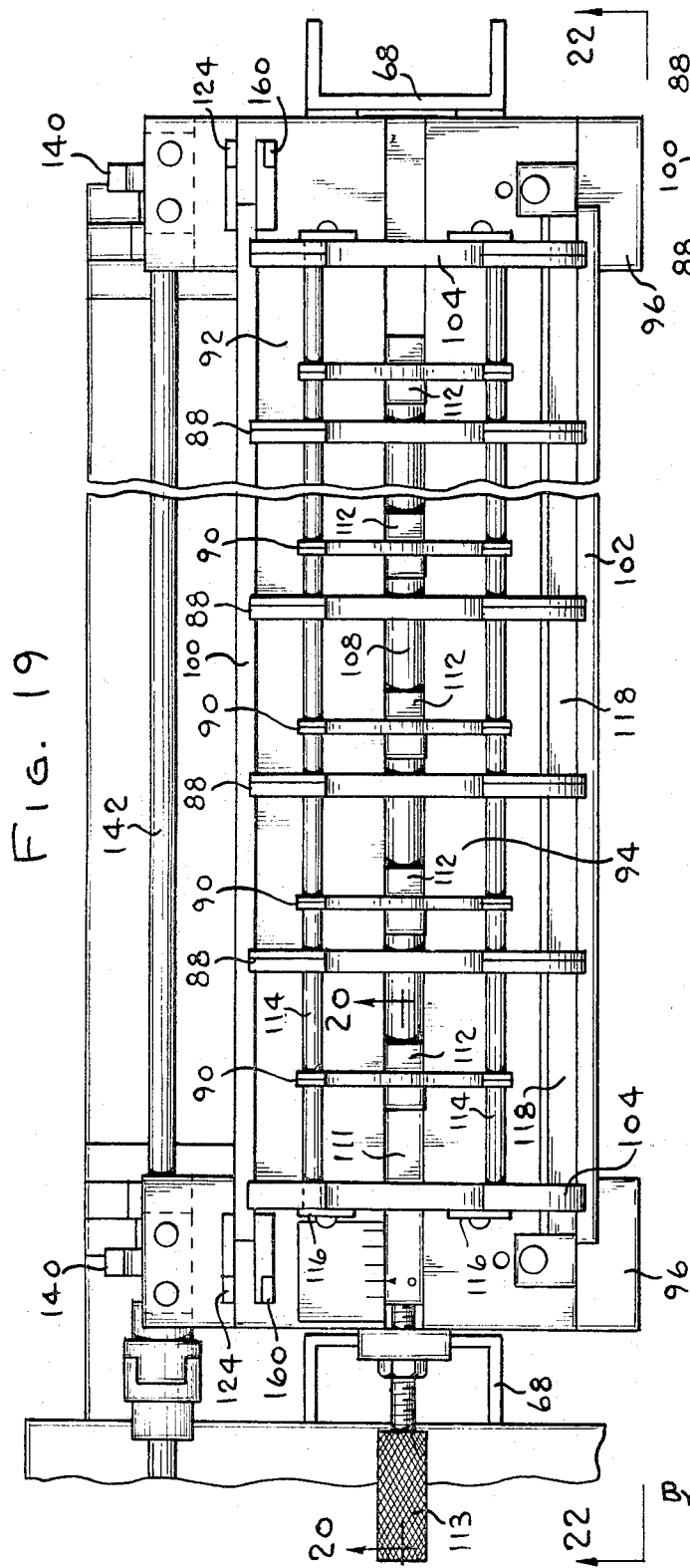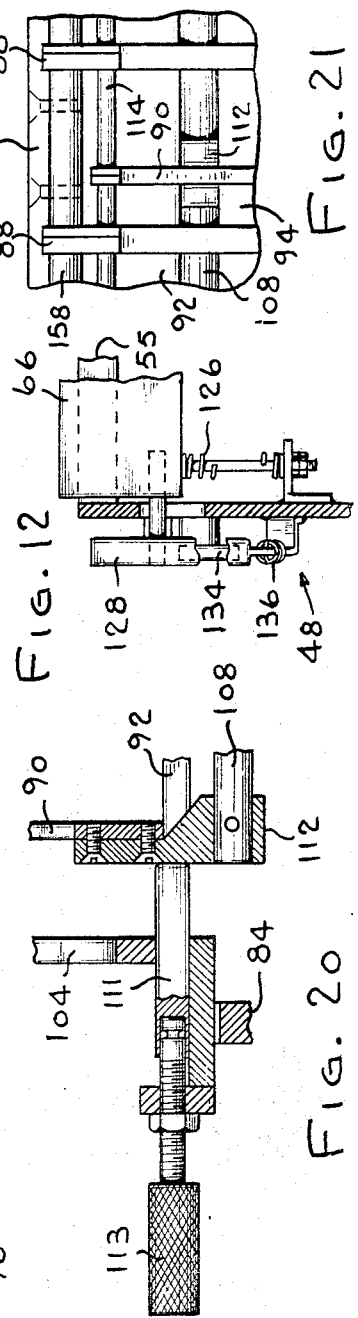

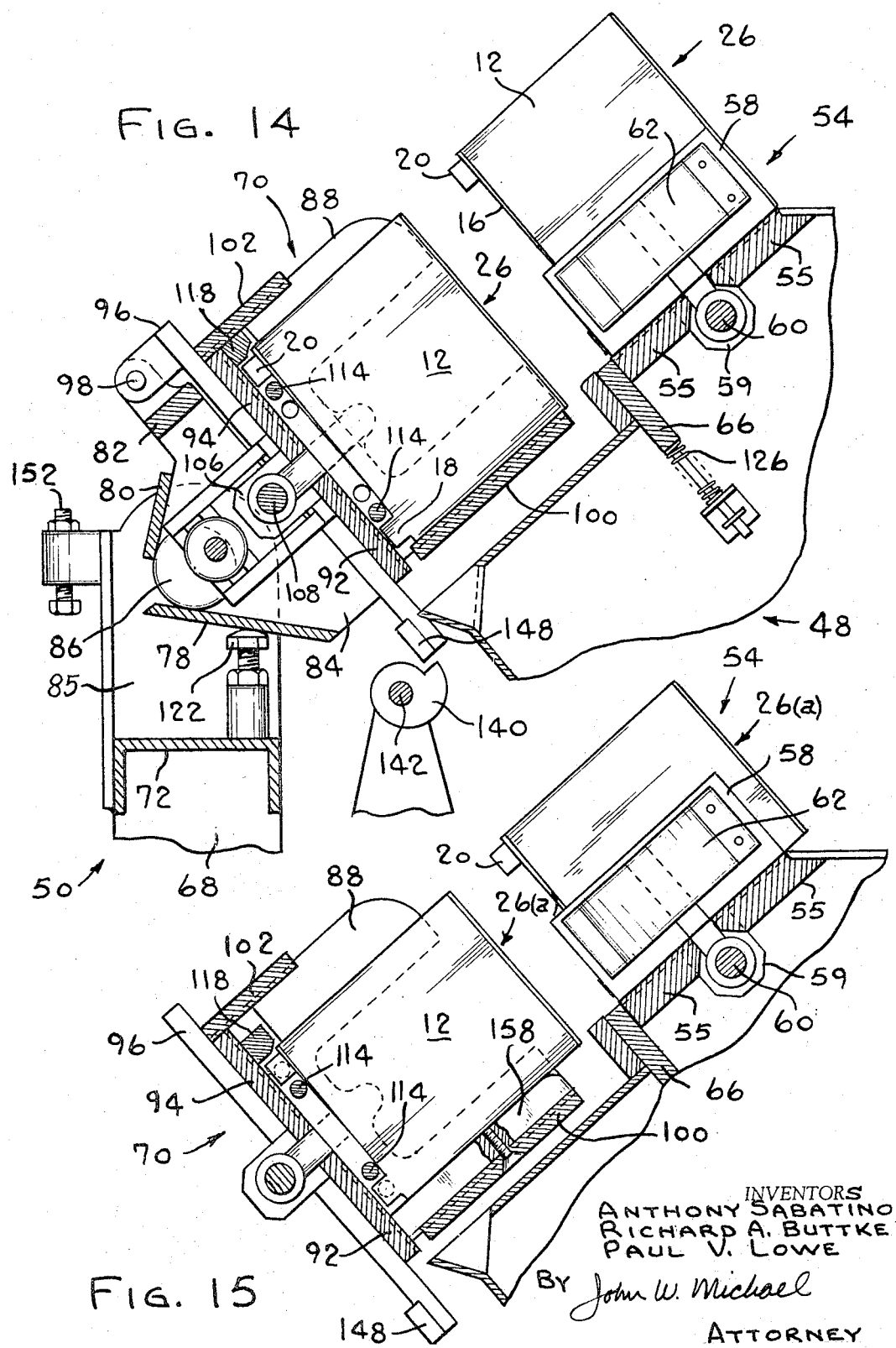

INVENTORS
ANTHONY SABATINO
RICHARD A. BUTTKE
PAUL V. LOWE
BY John W. Michael
ATTORNEY

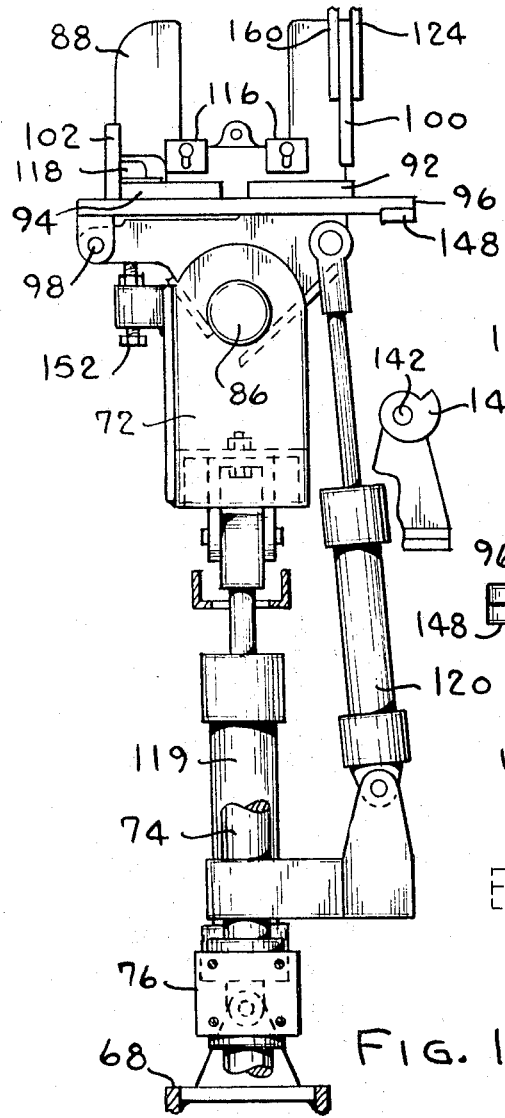
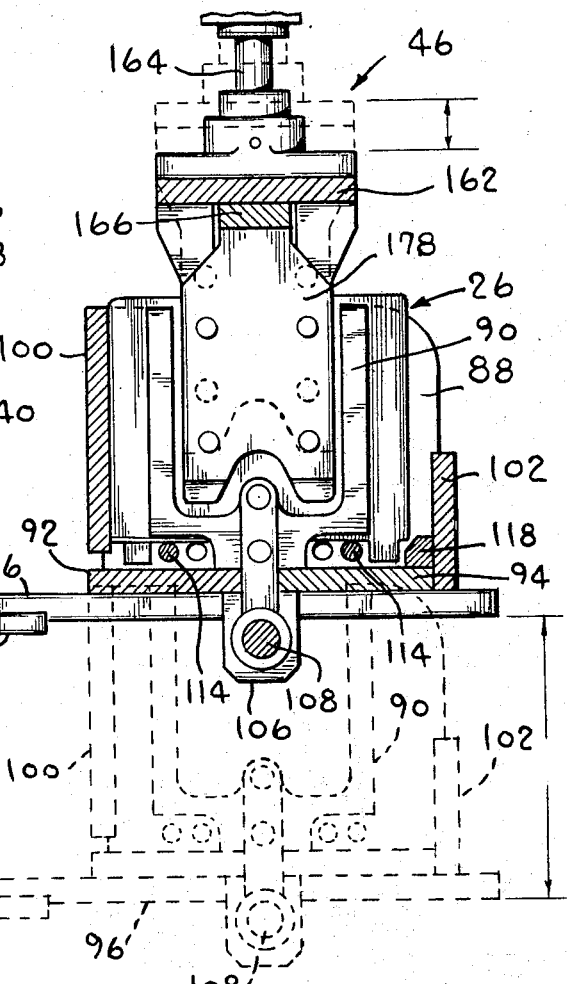
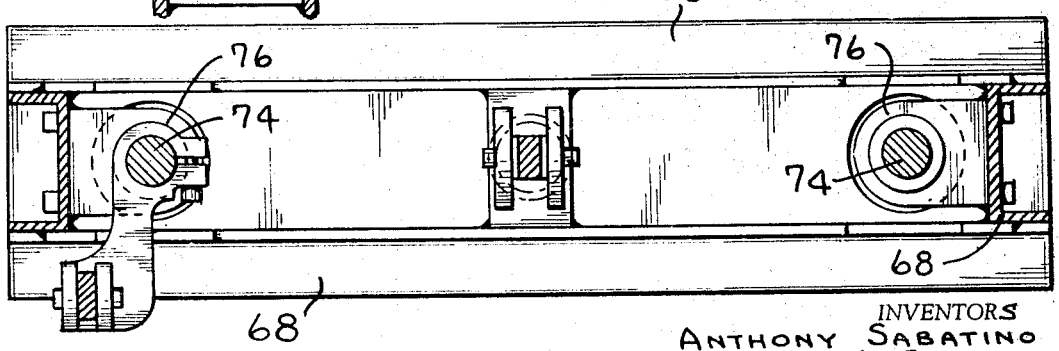

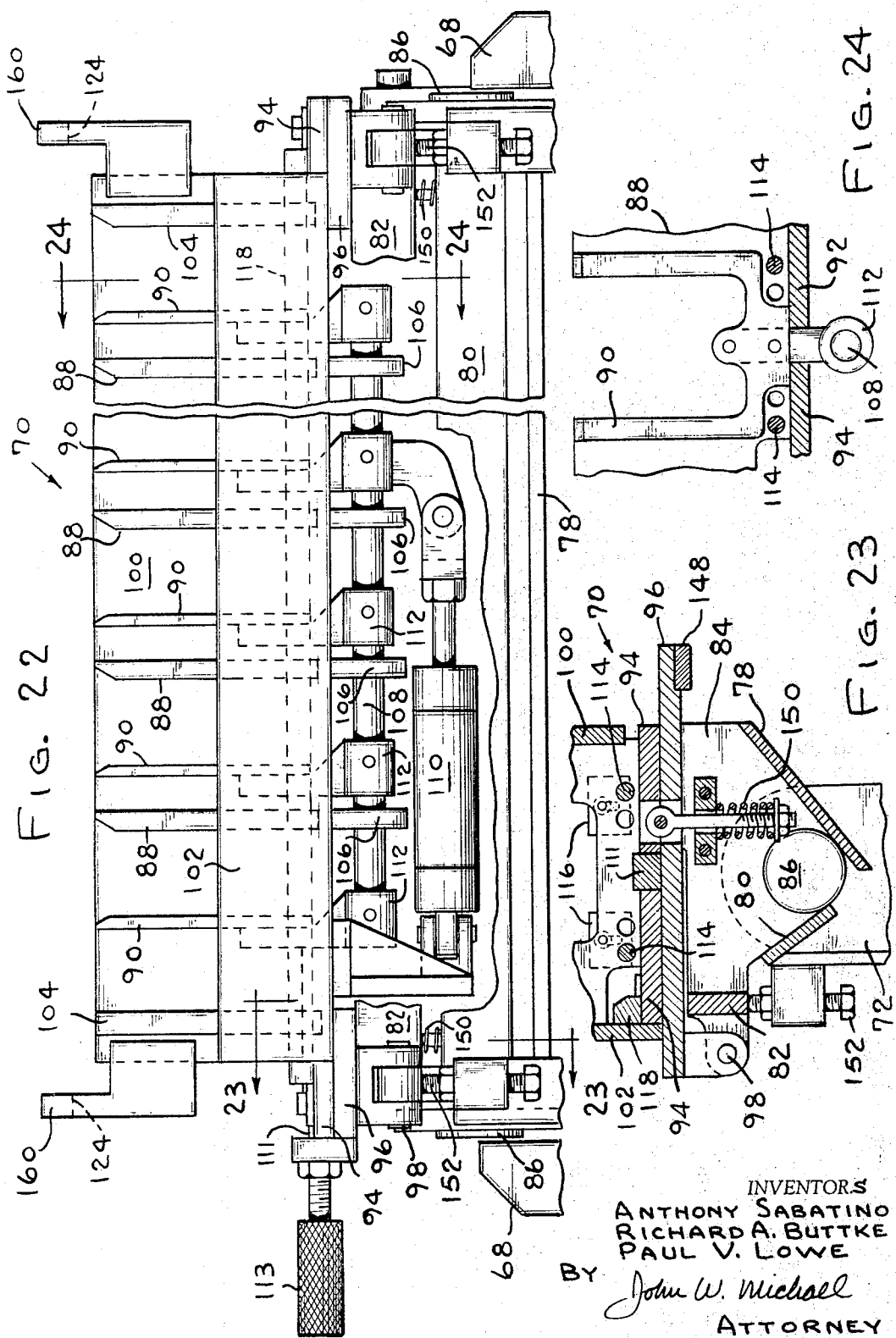

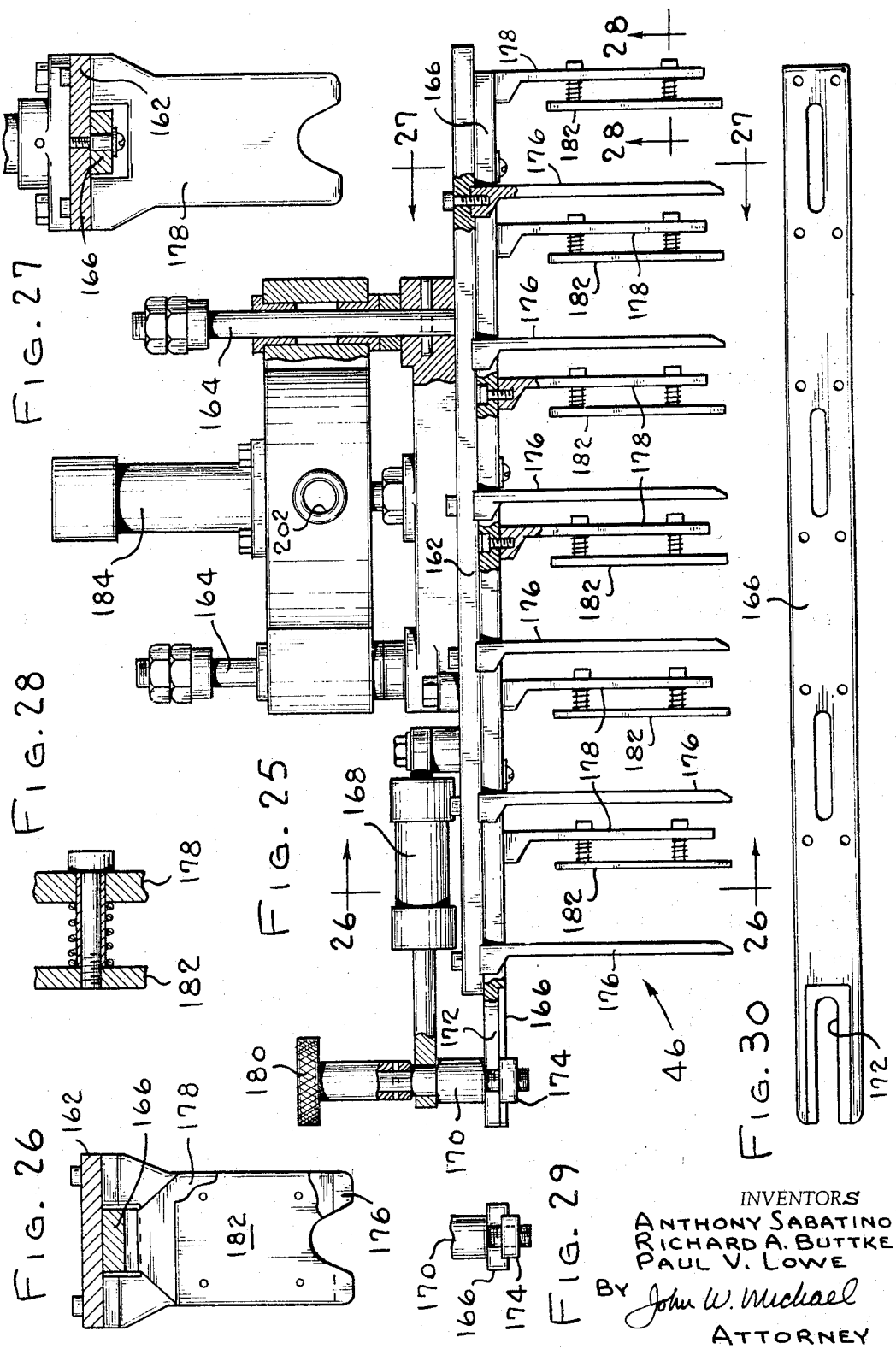

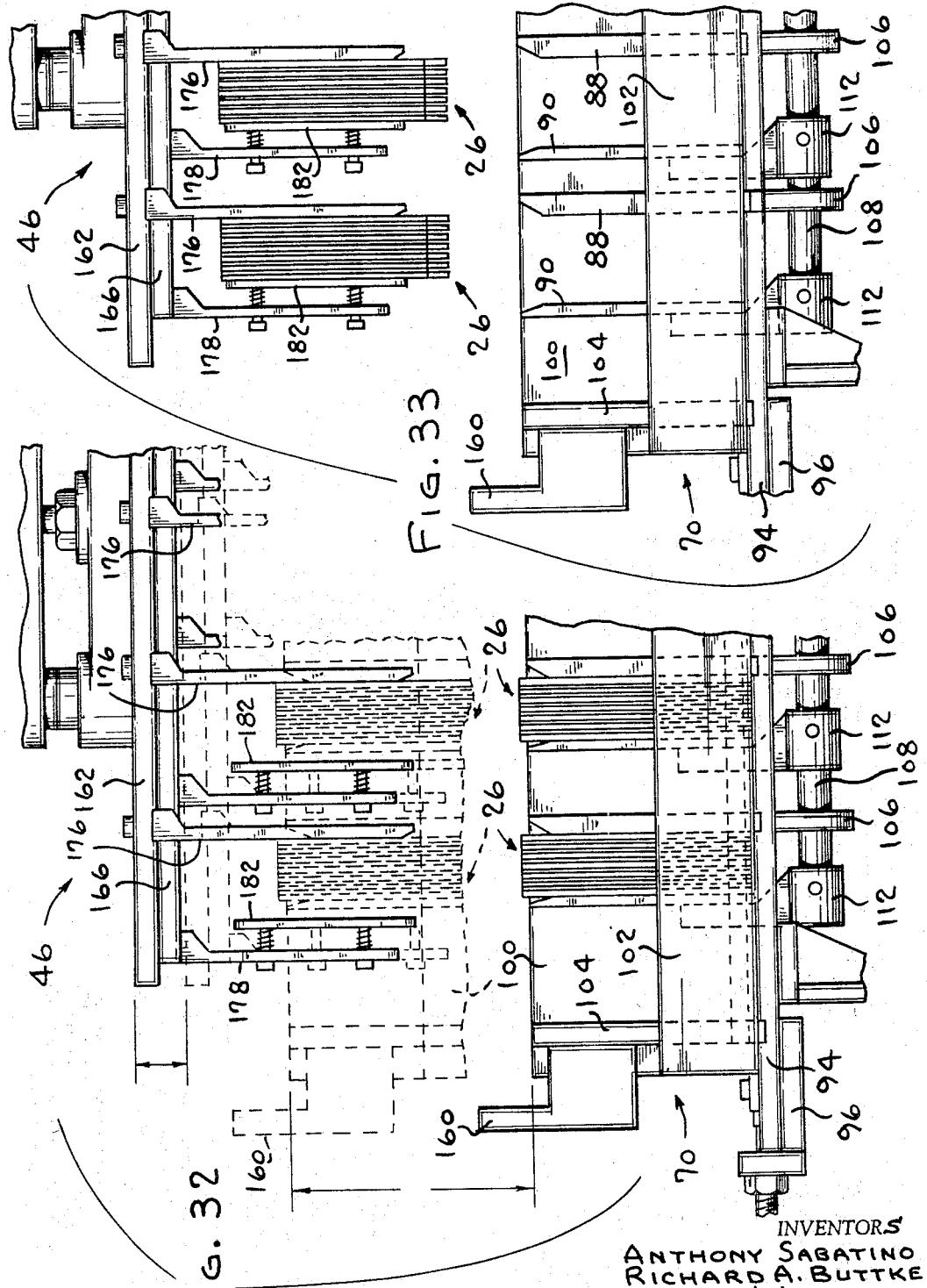

United States Patent Office 3,294,258
Patented Dec. 27, 1966

3,294,258
APPARATUS FOR ALIGNING THE PLATES AND SEPARATORS OF A BATTERY STACK
Anthony Sabatino, Minneapolis, Minn., and Richard A. Buttke and Paul V. Lowe, Milwaukee, Wis., assignors to Globe-Union Inc., Milwaukee, Wis., a corporation of Delaware
Original application Dec. 30, 1960, Ser. No. 79,728, now Patent No. 3,253,306, dated May 31, 1966. Divided and this application Sept. 16, 1965, Ser. No. 487,698
6 Claims. (Cl. 214—6)

This application is a division of application Serial No. 79,728, filed December 30, 1960, now Patent No. 3,253,306, and assigned to the assignee of this application.

This invention relates to a machine for fabricating elements for a storage battery and more particularly to a mechanism for accurately aligning the plates and separators of a battery stack as one step in the method described and claimed in U.S. Patent No. 3,087,005.

The principal object of this invention is to provide a mechanism which will accurately align the plates and separators of a battery stack, which mechanism will provide a maximum rate of production with a minimum amount of operator attention.

A further object is to provide such a mechanism which is of relatively simple construction.

Other objects and advantages will be pointed out in, or be apparent from the specification and claims, as will obvious modifications of the single embodiment shown in the drawings, in which:

FIG. 1 is a perspective view of two plates and a separator of battery stack;

FIG. 1(a) is a side elevation of a battery element with parts broken away;

FIG. 1(b) is a sectional view taken along line 1(b)—1(b) of FIG. 1(a);

FIG. 2 is a top plan view of the transfer mechanism of the machine showing the load and alignment station, flux station, casting station and unloading station in dotted lines;

FIG. 2(a) is a side elevation view of the machine shown in FIG. 2 as viewed from the load and alignment station;

FIG. 3 is a horizontal sectional view taken along line 3—3 of FIG. 2(a);

FIG. 5 is a side elevation view of the load and alignment mechanisms, with the alignment box in position to receive stacks from the loader;

FIG. 7 is a fragmentary side elevation view of the loader showing the stacks in loaded position;

FIG. 8 is a side elevation view similar to FIG. 7 but with the alignment box pivoted to receiving position;

FIG. 9 is a view similar to FIG. 8 but showing the relationship of the loader and alignment box when the machine has been modified to handle stacks of reduced width;

FIG. 10 is a fragmentary plan view taken along line 10—10 of FIG. 5;

FIG. 11 is a sectional view taken along line 11—11 of FIG. 10;

FIG. 12 is a sectional view taken along line 12—12 of FIG. 10;

FIG. 14 is a sectional view taken along line 14—14 of FIG. 13;

FIG. 15 is a view similar to FIG. 14 but with the machine modified to handle stacks of reduced width;

FIG. 17 is a vertical sectional view taken along line 17—17 of FIG. 16;

FIG. 18 is a horizontal sectional view taken along line 18—18 of FIG. 16;

FIG. 19 is a top plan view of the alignment box with the box pivoted to an upright position for transferring the stacks to a transfer head;

FIG. 20 is a sectional view taken along line 20—20 of FIG. 19;

FIG. 21 is a fragmentary view of a portion of the alignment box shown in FIG. 19 showing how the box is modified to receive stacks of narrower width;

FIG. 22 is a fragmentary side elevation view of the alignment box taken along line 22—22 of FIG. 19 with parts broken away;

Figure 4:
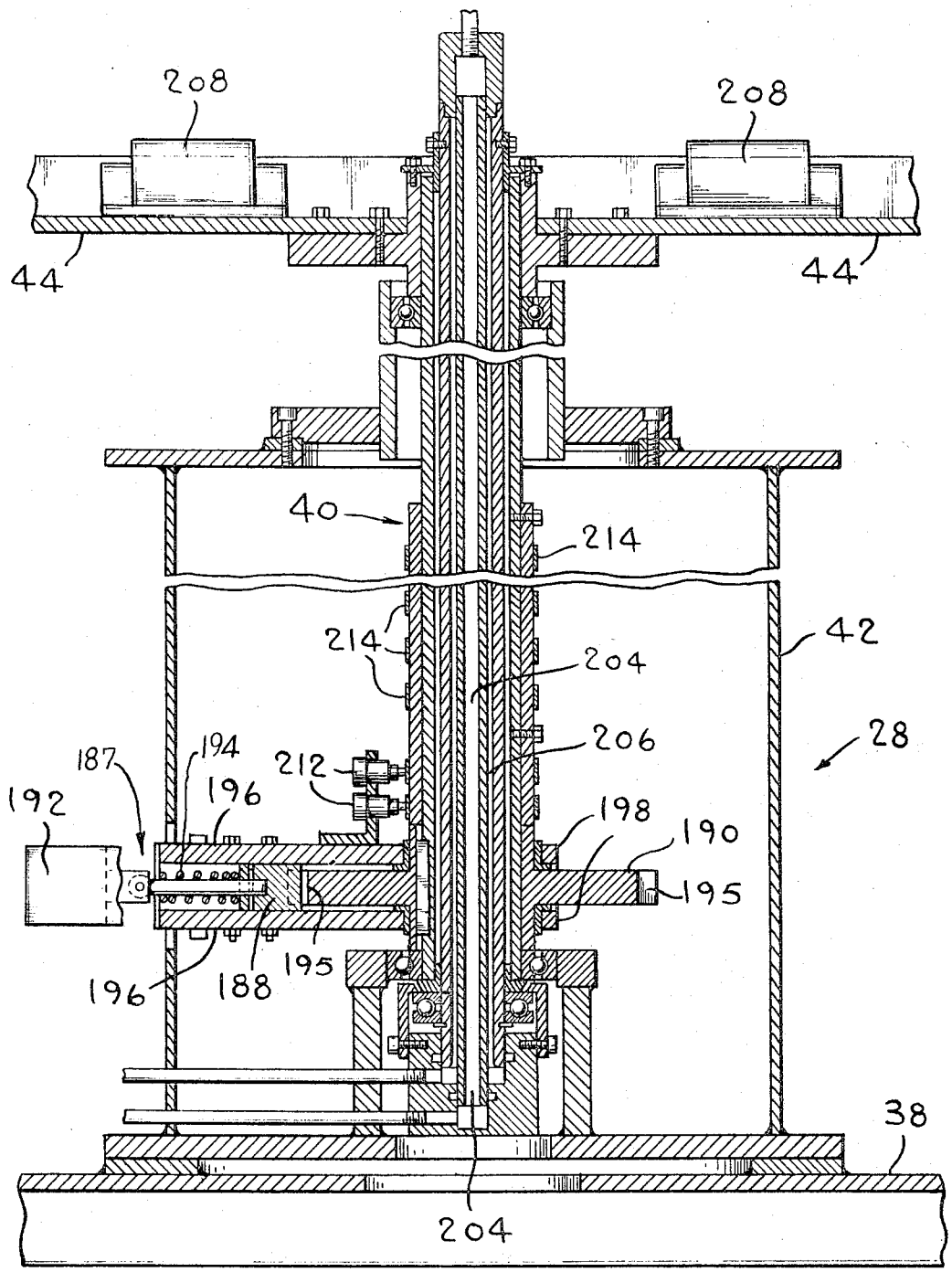
FIG. 4 is a vertical sectional view taken along line 4—4 of FIG. 3.
Figure 6:
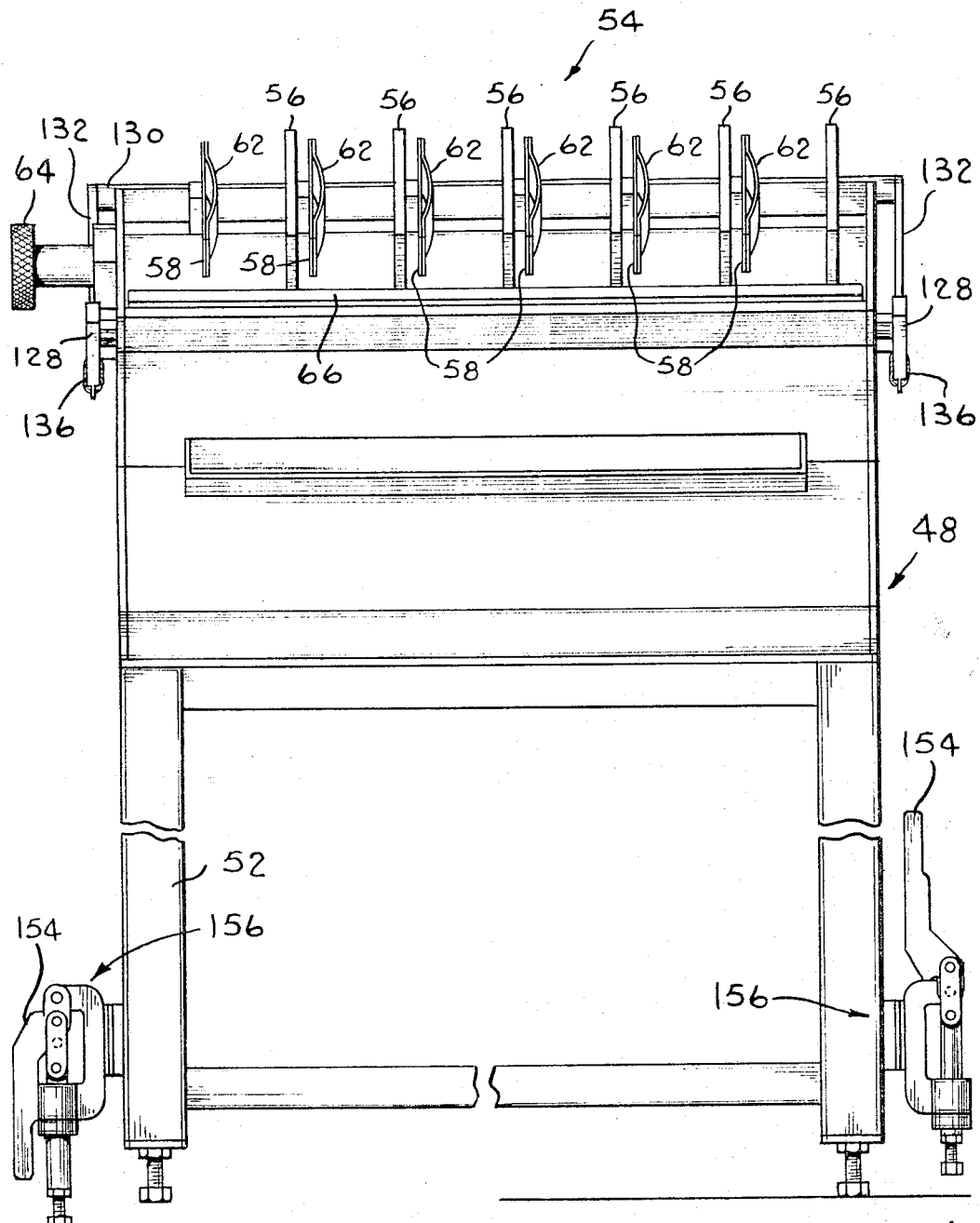
FIG. 6 is an elevation view of the load mechanism taken along line 6—6 of FIG. 5.

FIGS. 23 and 24 are sectional views taken along lines 23—23 and 24—24, respectively, of FIG. 22;

FIG. 25 is an elevation view of a transfer head mounted on the end of one of the transfer arms;

FIGS. 26, 27 and 28 are sectional views taken along lines 26—26, 27—27 and 28—28, respectively, of FIG. 25;

FIG. 29 is a fragmentary end view of the transfer head shown in FIG. 25;

FIG. 30 is a bottom plan view of the slidable clamping bar on which the movable clamping plates of the transfer head are mounted;

FIG. 31 is a sectional view taken through the transfer head and alignment box showing the part in position to transfer the stacks;

FIG. 32 is a fragmentary rear elevation view of a transfer head and alignment box prior to transfer of the stacks; and FIG. 33 is a view similar to FIG. 32 showing the head and box in position after the stacks have been transferred from the box to the transfer head.

The machine of this invention is designed for fabricating storage battery elements 10 of the type shown in FIGS. 1, 1(a) and 1(b). Each element 10 is comprised of negative and positive plates 12 and 14, respectively, alternately arranged between suitable separators 16. Plates 12 and 14 have lugs 18 and 20, respectively, to which post straps 22 and 24 are welded to form a complete element. The post of strap 24 serves as one of the battery terminals (positive) and is therefore heavier and longer than the post of strap 22. The plates and separators prior to attachment of the post straps are generally referred to as "stacks" and will hereinafter be identified by the reference numeral 26.

As explained in Patent No. 3,087,005, there are four major steps in the improved method described in such application for making a storage battery element.

The first step is to accurately align the stack. The second is the application of a suitable flux to the lugs of the plates. The third is the preheating of the lugs, and the fourth is the combined casting and welding operation wherein suitable post straps are cast onto the lugs.

A machine for performing the above steps is the subject matter of this application. The machine includes a stack transferring mechanism 28 (FIGS. 2, 2(a), 3 and 4) adapted to transfer a plurality of stacks 26 between a load and alignment station 30, a flux and preheat station 32, a casting station 34 and an unload station 36 (shown in dotted lines on FIG. 2).

The stack transferring mechanism 28 is mounted on a platform base 38 and includes a central column 40 rotatably mounted in a column support structure 42 as shown in FIG. 4. Four equally angularly spaced radially extending transfer arms 44 are mounted on the upper end portion of column 40. At the end of each transfer arm 44 is mounted a transfer head 46 adapted to pick up a plurality of stacks 26 and transfer them between stations. The four transfer heads 46 are of identical construction and are shown in detail in FIGS. 25-30 and will be described hereinafter.

The machine shown in the drawings is set up to handle a batch of six (6) stacks of plates and separators which, when fabricated into elements, form a complete set of elements for use in the six cells of a 12-volt storage battery. It should be understood, however, that the machine can be modified to handle various numbers and types of stacks. As will presently be described, the specific embodiment of the machine disclosed herein is designed to handle stacks of different widths.

Load and alignment station

The fabrication of elements 10 begins at the load and alignment station 30 at which location are mounted a load mechanism and an alignment mechanism indicated generally by numerals 48 and 50, respectively, and shown in FIGS. 5-33.

Loader 48 (FIGS. 5 and 6) includes a support frame 52 on which is mounted a loading head 54. Loading head 54 (FIGS. 10 and 11) comprises a pair of spaced inclined base plates 55 and a plurality of spaced stationary plates 56 and adjustable plates 58 which form six loading compartments into which stacks 26 are manually inserted. Stationary plates 56 are supported on base plates 55 and have apertured lower portions 59 which extend down between plates 55 to slidably support an adjustment rod 60. Adjustable plates 58 are pinned to adjustment rod 60 and are provided with spring facing members 62 to hold the stacks in place between the plates. The spacing of plates 56 and 58 can be adjusted by means of a knob 64 threaded on the end of rod 60 to adjust the loader to accommodate stacks of varying thicknesses.

The stacks 26 are inserted between plates 56 and 58 and are held therein against a movable stop member 66 (FIG. 7) in position for loading into the alignment mechanism 50.

Alignment mechanism 50 (FIGS. 5 and 16) includes a support frame 68 mounted on the main platform base 38 and an alignment box 70 mounted on the frame.

Figure 13:
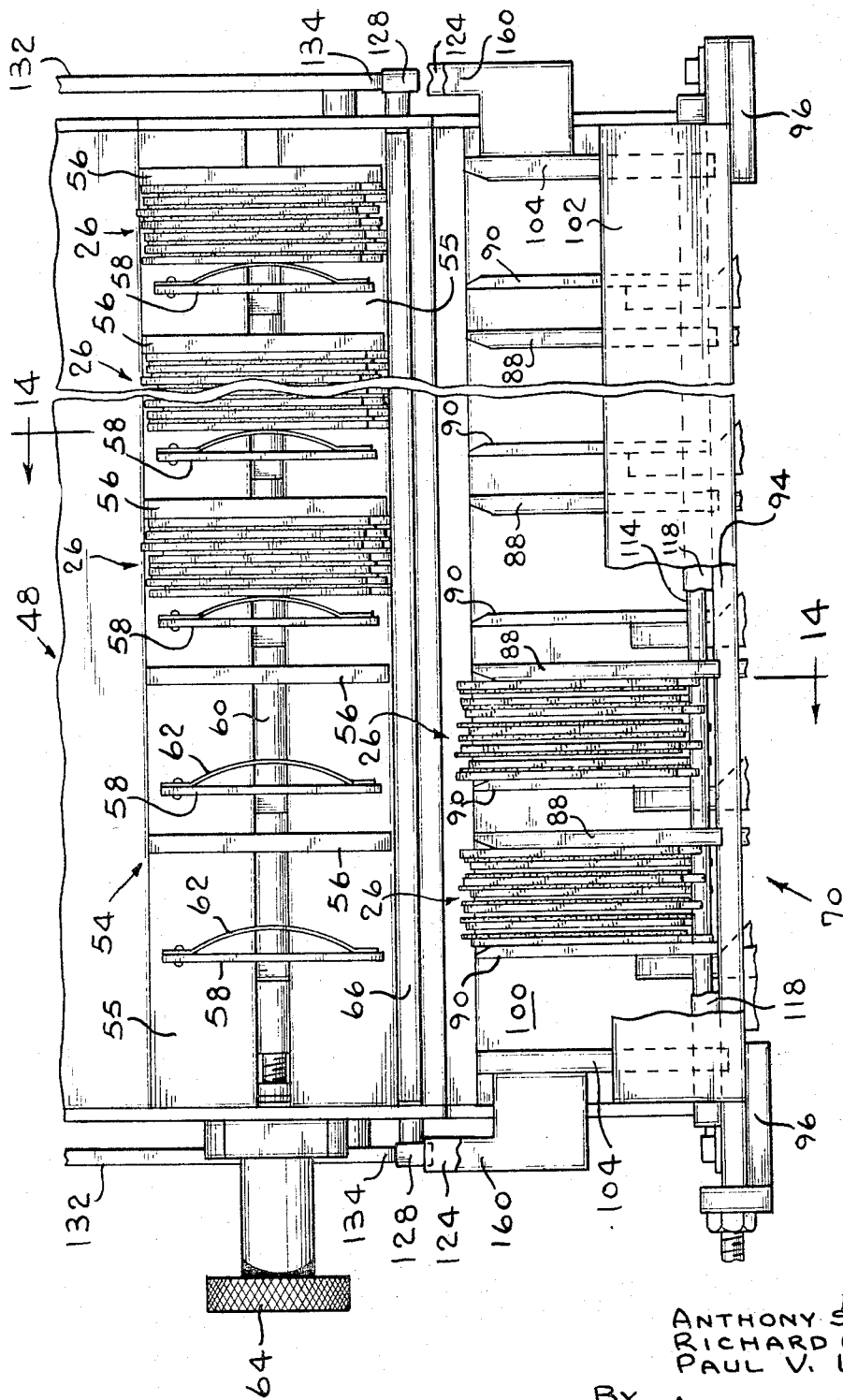
FIG. 13 is a fragmentary plan view taken along line 13—13 of FIG. 5 with certain parts broken away.

Alignment box 70 (FIGS. 16 and 17) is pivotally mounted on a U-shaped support member 72 supported on a pair of posts 74, 74 which, in turn, are slidably mounted in bearing blocks 76 fastened to frame 68. Alignment box 70 (FIG. 14) is comprised of cross support members 78, 80, 82 fastened between side plates 84, 84 which, in turn, are pivotally mounted on member 72 by pins 86. On top of the pivoted support structure formed by the cross supports and side plates is mounted a plurality of spaced stationary and movable clamping plates 88 and 90, respectively (FIG. 13). Plates 88 are mounted in grooves in cross support members 92 and 94 which, in turn, are fastened to vibrating bars 96, 96 pivotally connected to member 82 by pins 98 as shown in FIG. 14. The compartments into which the stacks are loaded for alignment are completed by front and rear plates 100 and 102, respectively, and end plates 104 as shown in FIG. 13.

Clamping plates 88 and 90 are cut out centrally as shown in FIG. 24 and stationary plates 88 have lugs 106 which extend down into the space between cross members 92 and 94. A clamping rod 108 is slidably mounted in aligned openings in lugs 106 and operatively connected to a clamping cylinder 110 mounted beneath the rod 108 as shown in FIG. 22. Movable plates 90 are fastened to fittings 112 which, in turn, are pinned to rod 108 so that the plates can be clamped together by cylinder 110. The spacing of plates 88 and 90 when in open position to receive stacks 26 can be adjusted by means of an adjusting pin 111 having a knob 113 threadedly mounted on one end plate 104 as shown clearly in FIG. 20. Cylinder 110 and the other actuating cylinders referred to hereinafter can be either hydraulically or pneumatically operated. In the preferred embodiment of the invention, however, all actuating cylinders are hydraulically operated.

A pair of spaced alignment rods 114, 114 extend between end plates 104 (FIGS. 19 and 24) which, together with front plate 100, serve to support stacks 26 when received from load head 54 as will presently be described. Rods 114 are held in position by tabs 116 (FIG. 23) which can be raised to allow the rods to be removed and replaced in a different spaced relationship to accommodate stacks of different width. The alignment box is also equipped with an alignment bar 118 which extends parallel to rods 114 and aids in the alignment of the stacks. The entire alignment box 70 can be raised and lowered vertically on frame 68 by a lift cylinder 119 connected between frame 68 and U-shaped support 72 as shown in FIG. 16.

Figure 16:
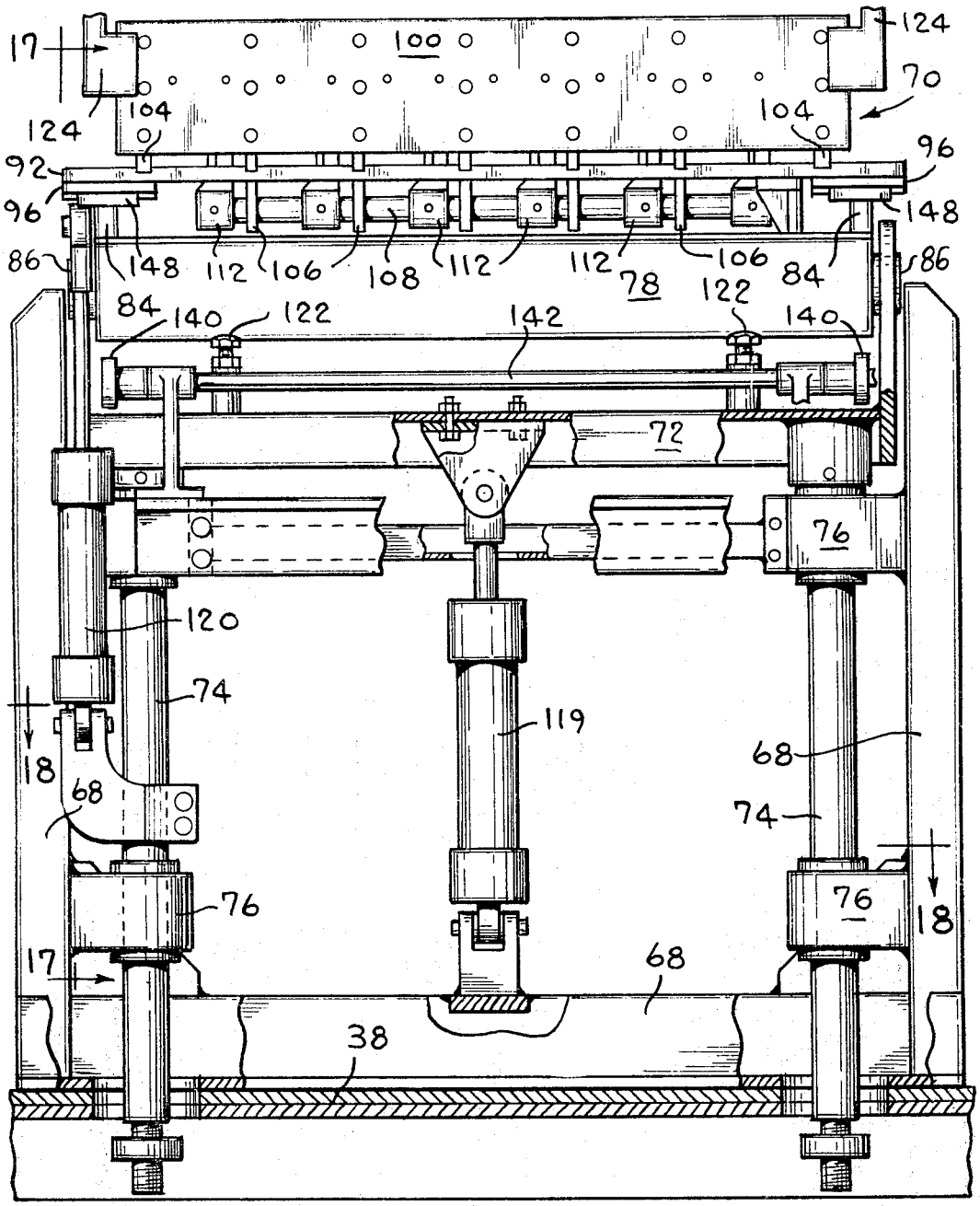
FIG. 16 is a front elevation view of the alignment mechanism as viewed from the operator's side with the loader mechanism removed and certain parts broken away.

After a batch of stacks has been loaded in load head 54, against stop bar 66 as shown in FIG. 7, alignment box 70 is pivoted to the aligning position shown in FIG. 5 by means of a tilting cylinder 120 mounted on one of the posts 74, as shown in FIG. 16. As box 70 is tilted into alignment position against adjustable stops 122 (FIG. 14), a pair of release fingers 124 mounted on front plate 100 will engage actuating lugs 128 pivotally mounted on the ends of stop bar 66 as shown in FIG. 12. Stop bar 66 will thereby be depressed against the bias of springs 126 (FIGS. 12 and 14). With the alignment box tilted to depress the stop bar, the stacks 26 are pushed manually from load head 54 into the alignment box 70 between stationary and movable clamping plates 88 and 90 where they will be supported by rods 114 and front plate 100.

After the stacks have been pushed into the alignment box (stop bar 66 can be released to allow loading of more stacks by pushing down on a release bar 130 having arms 132 pivotally mounted on the sides of the loader 48 as shown in FIGS. 7 and 8. Arms 132 have nose portions 134 adapted to engage lugs 128 and pivot the lugs out of engagement with fingers 124 and thereby allow stop bar 66 to be raised by springs 126. Tension springs 136 hold lugs 128 in contact with noses 134 and compression springs 138 serve to return arms 132 to raised position when bar 130 is released.

With the stacks in the alignment box the next operation involves vibration of the stacks to accurately align the plates and separators for further operations. This is accomplished by cams 140 mounted on a shaft 142 which is driven by a motor 144 through a gear box 146 (FIG. 5). Cams 140 when rotated ride in contact with pads 148 fastened to the ends of vibrator bars 96 to thereby oscillate the bars about pivot pins 98. As shown in FIG. 23, bars 96 are biased downwardly by springs 150 to thereby snap the stacks down sharply as pads 148 drop off the high points of cams 140 upon each rotation of the cams.

After the cams are rotated to vibrate the stacks, the aligned stacks are clamped securely in the vibrator box by energizing clamping cylinder 110. The alignment box 70 is then tilted back to its upright transfer position against adjustable stops 152 by energizing tilting cylinder 120. The stacks are now in position for transfer to a transfer head 46.

It should be noted at this point that the loader and alignment mechanisms are designed so that they can be readily modified to handle stacks of reduced width. Loader 48 is modified by simply actuating handle 154 of jack mechanism 156 from the position shown on the right hand side of FIG. 6 to that shown on the left hand side to thereby raise load head 54 with respect to the alignment box 70. The alignment box is modified by removing rods 114 from the position shown in FIG. 14 and installing them in the position shown in FIG. 15. Alignment bar 118 is also relocated as shown in FIGS. 14 and 15 and a spacer plate 158 is installed on front plate 100 as shown in FIGS. 15 and 21. With the above modifications the loader and alignment mechanisms can accommodate stacks 26(a) (FIG. 15) of reduced width. It will be noted in this regard that with load head 54 raised with respect to the alignment box 70, stop bar 66 will be depressed by a second pair of longer releasing fingers 160 fastened to plate 100 as shown in FIG. 9.

The construction details of a transfer head 46 are shown in FIGS. 25–30. Each head includes a stationary base plate 162 mounted on the ends of a pair of posts 164 which are mounted for vertical sliding movement at the ends of transfer arms 44. A clamping bar 166 (FIG. 30) is slidably mounted on the lower surface of plate 162 for actuating by a clamping cylinder 168 through an adjustable connection which includes a pin 170 engaged in a slot 172 in the end of bar 166 by a square nut 174 threaded on the end of the pin. Spaced stationary and movable clamping plates 176 and 178 are mounted on plate 162 and bar 166, respectively. The spacing of the clamping plates can be adjusted by adjusting the position of pin 170 in slot 172 by loosening and tightening the connection by turning knob 180 on pin 170. Movable clamping plates are provided with spring-mounted face plates 182. The entire transfer head 46 can be raised and lowered on arm 44 by an actuating cylinder 184 mounted on the top of each arm as shown.

By comparing FIG. 24 with FIGS. 26 and 27, it will be noted that the clamping plates of transfer head 46 are shaped to fit inside the cut-out portions of the clamping plates of the alignment box 70. Thus, with the alignment box in transfer position (FIG. 32) the alignment box is raised by energizing lift cylinder 119 and the transfer head 46 is lowered by energizing cylinder 184. This will move the box 70 and head 46 from the position shown in solid lines in FIG. 32 to that shown in solid lines in FIG. 31. With the parts in the FIG. 31 position the stacks are transferred to head 46 by energizing cylinder 168 in the clamping direction and energizing cylinder 110 in the release direction. The head 46 is then raised and the box 70 is lowered by energizing cylinders 184 and 119, respectively, to the position shown in FIG. 33. The aligned stacks thus transferred from box 70 to head 46 are now ready to be indexed to the next station.

The transfer mechanism 28 is indexed between stations by an indexing mechanism 185 (FIG. 3) including an indexing cylinder 186 mounted on column support 42 as shown in FIG. 3. Cylinder 186 is operatively connected to a solenoid actuated latch mechanism 187 which includes a latch pin 188 which is actuated in and out of engagement with a notched ring member 190 by a solenoid 192 and a return spring 194. Ring 190 is fixed to column 40 and as four notches 195 equally angularly spaced around the periphery of the ring. Latch mechanism 187 is rotatably mounted on column 40 by means of brackets 196 and 198 clamped to the column. To index the machine, solenoid 192 is energized to withdraw latch pin 188 from a notch 195. Cylinder 186 is then energized to rotate the latch mechanism counterclockwise on column 40 as viewed in FIG. 3 until the mechanism reaches the position shown in dotted lines wherein latch pin 188 will come into register with the next notch 195 and be engaged therein by spring 194. Cylinder 186 is then energized in the opposite direction to return it to its FIG. 3 position to thereby rotate ring 190 (and column 40) 90 degrees in a clockwise direction. This will carry the stacks from the load and alignment station 30 to the flux station 32.

As shown in FIG. 4, fluid under pressure for operation of cylinders 168 and 184 of the transfer mechanism is carried to such cylinders through passageways 204 and 206 in column 40. The fluid pressure in cylinders 168 and 184 is controlled by pairs of control valves 208, 210 mounted on arms 44 as shown in FIG. 2. Also as shown in FIG. 4, a plurality of microswitches 212 mounted on latch mechanism 187 rotate in contact with cam strips 214 on column 40 to perform certain control functions for the machine.

Operation

The operation of the machine is briefly as follows. The timing and sequence of operation of the various hydraulic cylinders, solenoids, etc. of the machine are controlled by a suitable electrical timing apparatus which is not a part of this invention and accordingly has not been described herein.

The fabrication of elements 10 begins at the load and alignment station 30. The assembled stacks 26 are inserted manually between plates 56 and 58 of loading head 54 and held therein against stop member 66 (FIG. 7) in position for loading into the alignment mechanism 50. For reasons to be explained hereinafter, the operator follows the practice of loading the far right hand stack in the loading head 54 last.

After a batch of stacks have been loaded in load head 54 against stop bar 66, alignment box 70 of alignment mechanism 50 is pivoted into aligning position shown in FIG. 5 by tilting cylinder 120. As box 70 is tilted into aligning position, a pair of release fingers 142 will engage actuating lugs 128 on stop bar 66 to thereby depress the stop bar and allow the plates to be pushed manually from the loading head into the alignment box between stationary and movable clamping plates 88 and 90 where they will be supported by guide rods 114 and front plate 100. After the stacks have been pushed into the alignment box, stop bar 66 can be released to allow loading of another batch of stacks by depressing release bar 130.

With the stacks in the alignment box the next step is the vibration of the stacks to accurately align the plates and separators for further operations. This is accomplished by cams 140 driven by a motor 144 which function to vibrate the stacks up and down as the cams are rotated.

After the stacks have been aligned they are securely clamped in the vibrator box by energizing clamping cylinder 110. The alignment box is then tilted back to its upright or transfer position by titling cylinder 120. The stacks are now in position for being transferred to a transfer head 46 of the transfer mechanism 28.

The stacks are transferred by raising the alignment box by energizing lift cylinder 119 and by lowering transfer head 46 by energizing cylinder 184 to thus move the box 70 and head 46 into the position shown in FIG. 31. The stacks are then transferred to head 46 by energizing clamping cylinder 168 thereof and energizing clamping cylinder 110 of the box 70 in the release direction. The head 46 is then raised and the box 70 is lowered by energizing cylinders 184 and 119, respectively, so that the stacks are now ready to be indexed to the next station. The aligned stacks are next indexed to the flux and preheat station 32 by energizing indexing cylinder 186.

Although but a single embodiment of the present invention has been illustrated and described, it will be apparent to those skilled in the art that various changes and modifications may be made therein without departing from the spirit of the invention or from the scope of the appended claims.

We claim:
1. An alignment mechanism for accurately aligning the plates and separators of a battery stack comprising:
   a frame;
   an alignment box adapted to receive and hold a plurality of battery stacks therein, said alignment box pivotally mounted on said frame so that it can be tilted to a non-vertical position to facilitate loading a stack therein and then pivoted back to a vertical position for removal of the stack after the stack has been aligned;

vibration means for vibrating the plates and separators of the battery stacks while in said alignment box; and a stationary load head mechanism mounted adjacent said alignment box, said load head adapted to receive battery stacks and to retain said stacks therein until it is time to transfer said stacks to said alignment box.

2. An alignment mechanism according to claim 1 in which said load head mechanism includes a movable stop bar against which battery stacks are held in said load head mechanism, said stop bar adapted when actuated to move to a non-blocking position to permit sliding movement of said battery stacks from said load head mechanism to said alignment box.

3. An alignment mechanism according to claim 1 in which said vibration means includes a pivoted member on which said alignment box is mounted and a rotatable cam member mounted for rotation at the free end of said pivoted member.

4. An alignment mechanism for accurately aligning the plates and separators of a battery stack comprising:

an alignment box adapted to receive and hold a battery stack therein, said alignment box pivotally mounted on a frame support including a power actuator for pivoting said alignment box between a position at an angle with the horizontal for loading and aligning a battery stack therein and a vertical position for transferring the aligned stack therefrom;

vibration means for vibrating the plates and separators of the battery stack while in said alignment box; and clamping means for clamping the aligned battery stack in the alignment box to securely hold the stack in aligned position for subsequent transfer to other mechanism for further processing thereof.

5. An alignment mechanism according to claim 4 in which said clamping means includes stationary and movable clamping plates between which the plates and separators of the battery stack are inserted, said clamping means further including a power actuator operatively connected to said movable clamping plate.

6. An alignment mechanism according to claim 5 in which said alignment mechanism further includes a support member on which said alignment box is mounted and a frame member on which said support member is slidably mounted to permit vertical movement of said support member and box with respect to said frame, said alignment mechanism further including a power actuator operatively connected to said support member for vertical actuation thereof.

References Cited by the Examiner

UNITED STATES PATENTS

| 492,130 | 2/1893 | Wright. | |
| 1,236,892 | 8/1917 | Wilson | 271—89 |
| 1,837,607 | 12/1931 | Biggert. | |
| 2,517,675 | 8/1950 | Keller | 214—6 |
| 2,834,384 | 5/1958 | Pearl | 271—89 |
| 3,088,604 | 5/1963 | Nilsson | 214—6 |

GERALD M. FORLENZA, *Primary Examiner.*

J. E. OLDS, *Assistant Examiner.*